United States Patent [19]
Gerakoulis

[11] Patent Number: 5,838,669
[45] Date of Patent: Nov. 17, 1998

[54] METHOD OF SYNCHRONIZING SATELLITE SWITCHED CDMA COMMUNICATION SYSTEM

[75] Inventor: Diakoumis Parissis Gerakoulis, Dover, N.J.

[73] Assignee: AT&T Corp., Middletown, N.J.

[21] Appl. No.: 704,041

[22] Filed: Aug. 28, 1996

[51] Int. Cl.$^6$ ....................................................... H04J 3/06
[52] U.S. Cl. ........................................... 370/320; 370/519
[58] Field of Search ..................................... 370/342, 350, 370/320, 335, 316, 514, 515, 519; 375/206, 207, 208, 209, 205, 210, 362, 364, 367, 371, 373, 374, 375, 376, 359

[56] References Cited

U.S. PATENT DOCUMENTS

| | | | |
|---|---|---|---|
| 5,003,552 | 3/1991 | Mower | 375/206 |
| 5,048,053 | 9/1991 | Mower et al. | 375/206 |
| 5,105,437 | 4/1992 | Kingston et al. | 375/206 |
| 5,128,957 | 7/1992 | Nakagawa | 375/208 |
| 5,359,624 | 10/1994 | Lee et al. | 375/200 |
| 5,504,787 | 4/1996 | Zscheile et al. | 375/208 |
| 5,617,410 | 4/1997 | Matsumoto | 370/342 |
| 5,638,362 | 6/1997 | Dohi et al. | 370/342 |

*Primary Examiner*—Ajit Patel
*Attorney, Agent, or Firm*—Alfred G. Steinmetz

[57] ABSTRACT

Synchronization of a terrestrial transmitted CDMA signal with despreading and respreading in a remote satellite, for transmission to a second terrestrial site, is achieved in accord with the processes recited in the appended claims. Uplink access and synchronization signals are acquired at a satellite switch and a reference propagation delay time is established in terms of quantified timing marks with intervals within a size range of chip intervals used in the CDMA spreading codes of the system. The propagation delay is defined in terms of one of the quantified timing marks defining when a first signal from a terrestrial subscriber unit is received. This propagation delay is transmitted to a terrestrial subscriber unit and utilized to adjust the timing of uplink CDMA code chips.

16 Claims, 12 Drawing Sheets

BEAN CODES $W_i(t)$ AND $g_i(t)$ HAVE RATE 9.8304 Mc/s

USER ORTHOGONAL CODES $W_{ki}(t)$ HAVE RATE 2.4576 Mc/s $\Delta T_{ki} = (n_{ki} + k_i)T_c$ sec $x = n_{ki} + k_i$ chips $\Delta T_{ki}$: PROPAGATION DELAY DIFFERENCE FROM THE REFERENCE SU

METHOD OF SYNCHRONIZING SATELLITE SWITCHED CDMA COMMUNICATION SYSTEM

FIELD OF THE INVENTION

This invention relates in particular to synchronization of a communication system and in particular to a synchronization of a communication system transmitting satellite switched CDMA beams. It is specifically concerned with global synchronization of multiple ground station transmissions with a satellite switch in a multiple point to point communication system.

BACKGROUND OF THE INVENTION

Satellites have been part of terrestrial communication systems since their inception. Their most frequent application in communication systems has been as relays or as repeaters interconnecting terrestrial stations (i.e., a bent pipe connection). It has been generally considered too difficult to design equipment for switching of signals within the satellite due to weight and size limitations. Hence signal switching has been performed at the ground station with the satellite operating as a bent pipe where ground transmitted signals within a beam are redirected in their entirety as a beam to a ground receiver.

Satellite switching has been achieved in systems by utilizing CDMA signal transmission, by isolating individual uplink traffic channels by despreading techniques and by selectively combining the traffic channels into downlink beams by respreading the traffic channels. This technique is discussed in my co-pending application Ser. No. 08/635,162 filed Apr. 23, 1996. Making such a system work efficiently requires maintaining orthogonality between various signals in the CDMA beam and between multiple CDMA beams. In multipoint-to-point systems such efficiency requires system/global synchronization of spreading and despreading codes. This is, at present, difficult to achieve with known techniques without extensive ground based synchronizing systems. Such systems are expensive and limit flexibility in operation in adding and removing ground stations.

SUMMARY OF THE INVENTION

In a communication system having multiple-point-to-point communications processed through a satellite based switch, switched CDMA processing is enabled by a global synchronization process that synchronizes each participating element to a common global reference point without requiring an extensive ground based synchronization system.

Synchronization of a plurality of codes of terrestrial transmitted orthogonal CDMA signals with despreading and respreading in a remote satellite, for transmission to a second terrestrial site, is achieved with a satellite based synchronization system in accord with the processes recited in the appended claims.

Specifically global synchronization is attained by constraining all ground subscriber units to begin all transmissions in synchronism with a common reference time under control of a connecting satellite. This common reference time is established for all ground subscriber units through signal interaction with the connecting satellite whereby both an initial coarse and a subsequent continuous and finely adjusted synchronization for a particular ground station is developed and maintained.

In an illustrative embodiment downlink synchronization signals and uplink access signals are used to acquire synchronization between a satellite switch and a ground station. A reference propagation delay time is established in terms of quantified timing marks with intervals within a size range of chip intervals used in the CDMA spreading codes of the system. The propagation delay is defined in terms of one of the quantified timing marks defining when a first signal from a terrestrial subscriber unit is received. This propagation delay is transmitted to the originating terrestrial subscriber unit and utilized to adjust the timing of subsequent uplink CDMA code chips.

In another aspect of the invention successive traffic channel transmissions are used to interact with timing equipment of the ground station and satellite switch to continuously refine the state of synchronization.

Synchronization, of each ground station, is referenced to a common reference point so that all transmitting ground stations share a common reference start transmission time so that both ground station and satellite switch spreading/despreading codes are in substantial synchronization, with the propagation delay taken into account.

DETAILED DESCRIPTION

In the illustrative embodiment a spectrally efficient CDMA ( the spectral efficient teaching of co-pending application Ser. No. 08/644346 filed May 10, 1996, is incorporated by reference) uplink signal is synchronized in accord with the principles of the invention by establishing a reference mark at which code signals are transmitted from a ground station to a satellite. Initial uplink signals use asynchronous delay to capture CDMA signals transmitted through the access channel. In a properly synchronized system all uplink traffic channels must arrive synchronously, with respect to CDMA codes, at the satellite receiver in order to maintain orthogonal separation requirements between signals, including traffic channels within beams as well as between beams. For orthogonality to occur substantial synchronization is required. Analysis of system operation indicates that slight deviations in synchronization (e.g., 10%) will not seriously interfere with non-blocking system operation. In deed such deviations are used to continuously refine and maintain the state of synchronization. Downlink signals from the satellite are synchronous code division multiplexed signals which are directed to a particular destination and hence are not multiple access.

A geostationary fixed service multi-beam switching satellite is contemplated in the illustrative embodiment. The communication system provides both multiple access to and switching within a multiple beam handling satellite. Space division is also used in the illustrative overall system whereby a plurality of multibeam antennas (e.g., 32) are used to accommodate many beams and fully utilize all the available spectrum. CDMA is used to provide access for a plurality of users in each individual frequency band in each of a plurality of CDMA beams. User CDMA data is spread, in the illustrative embodiment over a bandwidth of 10 MHz.

Switching of traffic channels from an uplink beam to a downlink beam is achieved by utilizing spreading and despreading codes to separate individual traffic channels from uplink beams and combine them into downlink beams in which all the traffic channels in the downlink beam have identical destinations with each other and with the downlink beam. Such a switching system is described in my co-pending application Ser. No. 08/635162 filed Apr. 23, 1996, whose teaching is incorporated herein by reference. In order to operate properly and maintain orthogonality for both beam and channel isolation the spreading and despreading codes must be orthogonal and substantially system wide synchronized. Such synchronization is maintained herein by establishing a propagation delay, obtaining an initial coarse synchronization and then constantly fine tuning the synchronization to achieve steady state synchronization as described below.

Figure 1:
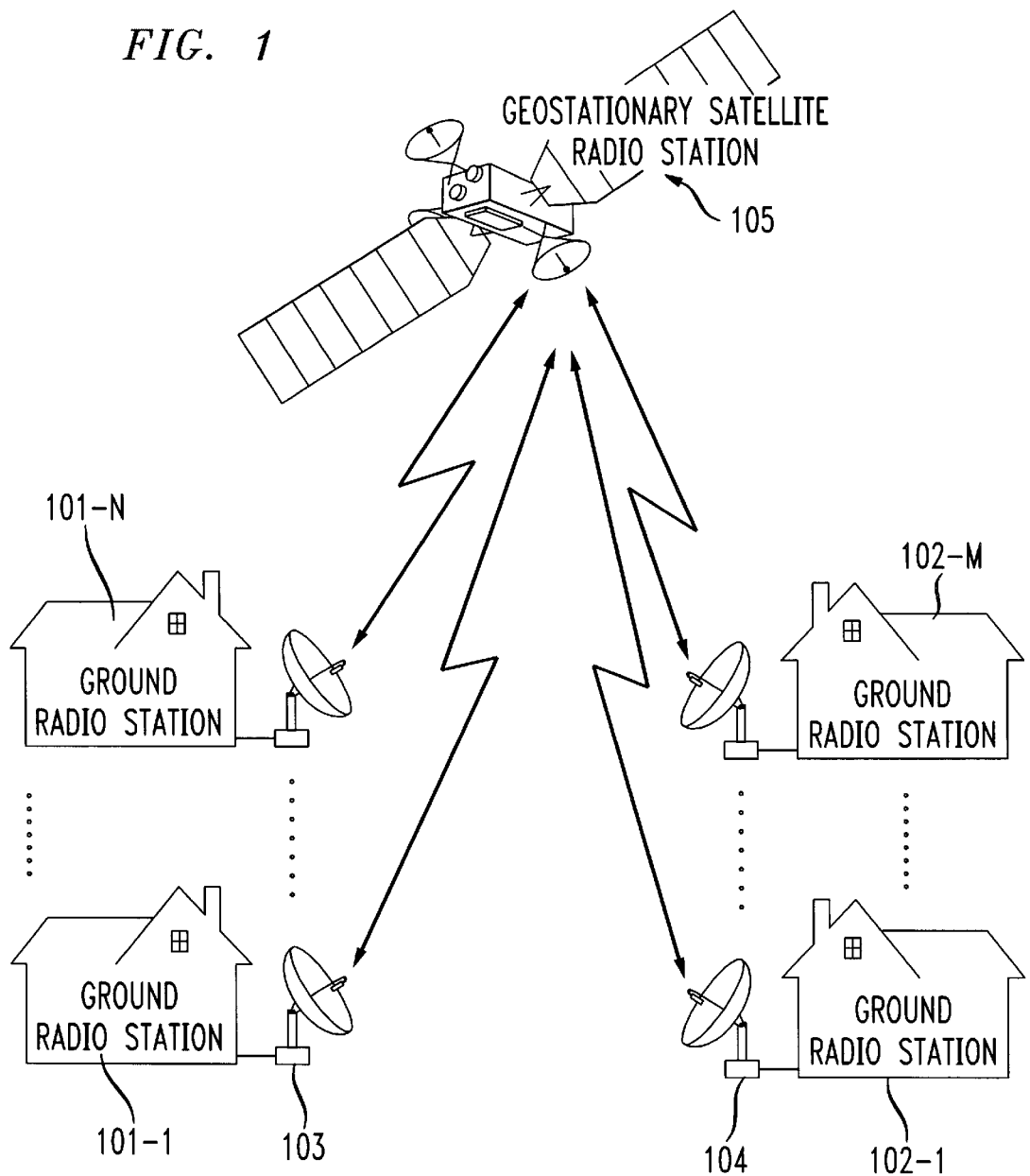
FIG. 1 is a schematic of a communication system using a satellite switch.

An illustrative satellite communication system coupling a transmitting ground station to a receiving ground station (i.e., also called subscriber units; SU) is shown schematically in FIG. 1. While illustratively depicting individual transmitting and receiving stations 101 and 102 these stations also could be radio transmitting points and radio receiving points of a telephone system. These stations are preferably fixed spatially/geographically, when transmitting and receiving as opposed to being mobile stations. These stations are typically bi-directional transceivers. They could be individual stations at a local access terminus.

Station 101-1, in the illustrative embodiment, includes a satellite dish antenna 103 which directs RF CDMA (i.e., Code Division multiple Access) packet/beam signals to a satellite 105. Station 102-1 receives RF CDM (i.e., Code division Multiplexed; downlink is not multiple access) packet/beam signals from the satellite 105 via its accompanying satellite dish antenna 104. Each beam signal includes a plurality of individual channels or bands. As shown the satellite receives RF CDMA beam signals from plurality of other transmitting stations 101-N and transmits RF CDM beam signals to a plurality of receiving stations 102-N. All stations may both transmit and receive messages.

The interface connection between the stationary SUs and the satellite is via a Common Air Interface (CAI). The CAI includes various control and traffic channels all on assigned frequency bands consolidated into beams. Control channels include an Access channel in the uplink mode. Pilot, SYNC and Paging channels are included in the downlink mode. Signaling messages are carried by the Access and Paging channels and initial timing is handled by the Pilot and SYNC channels. Uplink and downlink Traffic channels carry voice, data and signaling information between terminal end SUs and are further used for continual fine tuning of synchronization of system SUs. Multiple access and modulation of the traffic channels may be based on spectrally efficient CDMA processing such as described in my co-pending patent application Ser. No. 08/644,346 filed May 10, 1996 which is incorporated herein by reference. A spectral efficient transmission is obtained therein by Trellis Code modulation and CDMA spreading. As discussed therein, the spectrally efficient processing requires good orthogonal separation between the codes defining individual beams. In the present embodiment turbo code modulation is preferred due to its spectral properties which are similar to trellis coding properties but better in providing spectral efficiency. Both coding techniques are well known to those skilled in the art and hence are not discussed in detail herein.

Traffic channels within the satellite are switched from an uplink beam to an appropriate downlink beam by a method of despreading and subsequent respreading which separates, defines and directs the individual traffic channels into appropriate downlink beams.

Figure 2:
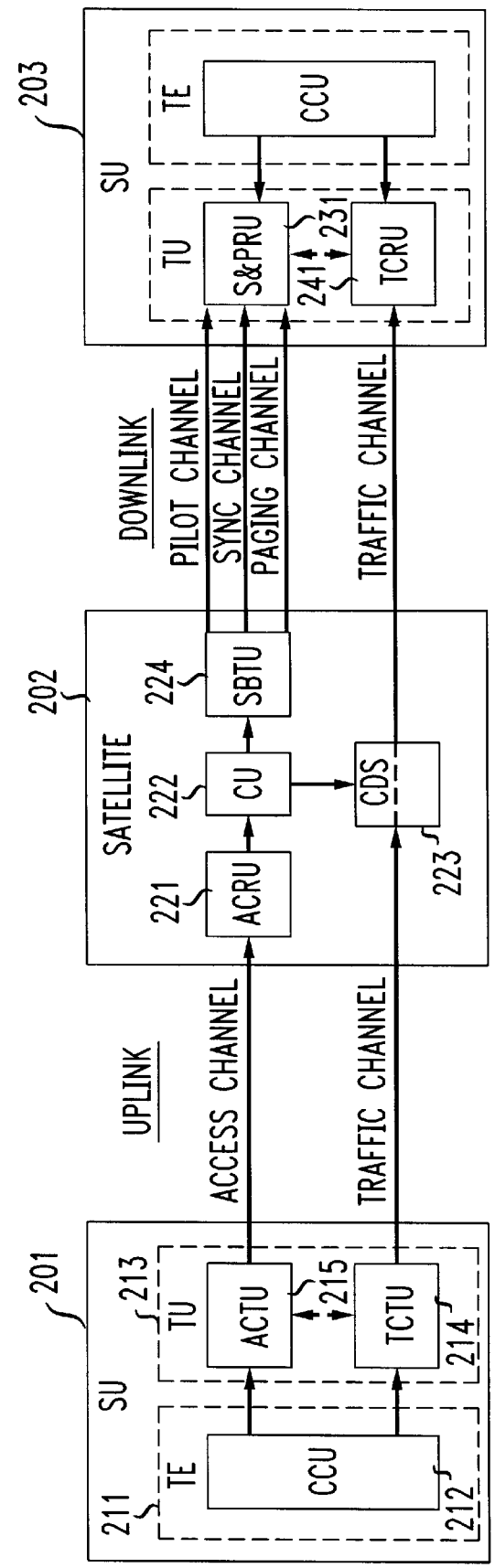
FIG. 2 is a block schematic of a ground transmitter-to-satellite-to-ground receiver system.

An illustrative unidirectional uplink-to-satellite-switching-to-downlink arrangement is shown in the FIG. 2 schematic. The transmitting circuitry of ground/subscriber unit (SU) 201 generates uplink CDMA beams each including a plurality of traffic channels (i.e., bands) and an access channel. The traffic channels are switched in the satellite 202 and sent as a CDM downlink beam to the subscriber unit receiver 203. A rudimental system architecture, such as shown in the FIG. 2, has Terminal Equipment (TE) 211 and Transceiver Unit (TU) 213 as transmitting equipment shown at the transmitting SU 201 and similar TE and TU receiving equipment at the receiving SU 203. A Code Division Switch in the satellite 202 switches uplink traffic channels of an uplink beam into a downlink beam defining the destination of the downlink traffic channel. While the SUs in FIG. 2 are shown with only either transmitting or receiving capability the illustrative SU, as shown in the FIG. 3, includes both capabilities in one SU.

The transmitting SU 201 includes a Call Control Unit 212 (CCU) included in the TE 211 and a Traffic Channel Transmitter Unit (TCTU) 214 included in the TU 213. The TU 213 also includes an Access Channel Transmitter Unit (ACTU) 215. The Access channel transmission unit provides communications which as described below allow establishment of a reference offset, used to define a propagation delay, in the synchronization process.

The access channel transmits access signals to an Access Channel Receiver Unit (ACRU) 221 located in the satellite 202. Signals in the Access Channel provide information to create a traffic channel between the transmitting SU 201 and the satellite 202. The ACRU is connected to a Control Unit 222 (CU) in the satellite which supplies control signals to the code division switch (CDS) 223 which interconnects uplink and downlink beams by switching uplink traffic channels in uplink beams to downlink beams having destinations in common with the traffic channels they contain. A description of a CDS is included in the application Ser. No. 08/643720 filed May 6, 1996, and in the application Ser. No. 08/635162. Both were simultaneously filed Apr. 23, 1996. The teachings of both these references are included herein by reference.

A Satellite Broadcast Transceiver Unit (SBTU) 224 transmits paging SYNC and pilot channel signals to the SYNC and Paging Receiver Unit (S&PRU) 231. Traffic channels switched by the CDS 223 are transmitted to the Traffic Channel Receiver Unit 232 of the SU 203.

In operation of the system a SU 201 initiates a message request, via the access channel, to the on-board CU 222 of the satellite 202. The CU 222 assigns an uplink and downlink frequency band or traffic channel along with routing information and CDMA codes for messaging use. This routing information, assigned codes and channel assignment supplied to the CDS 223 enable transmission to the recipient SU 203 to allow full duplex communication between SU 201 and 203.

Figure 3:
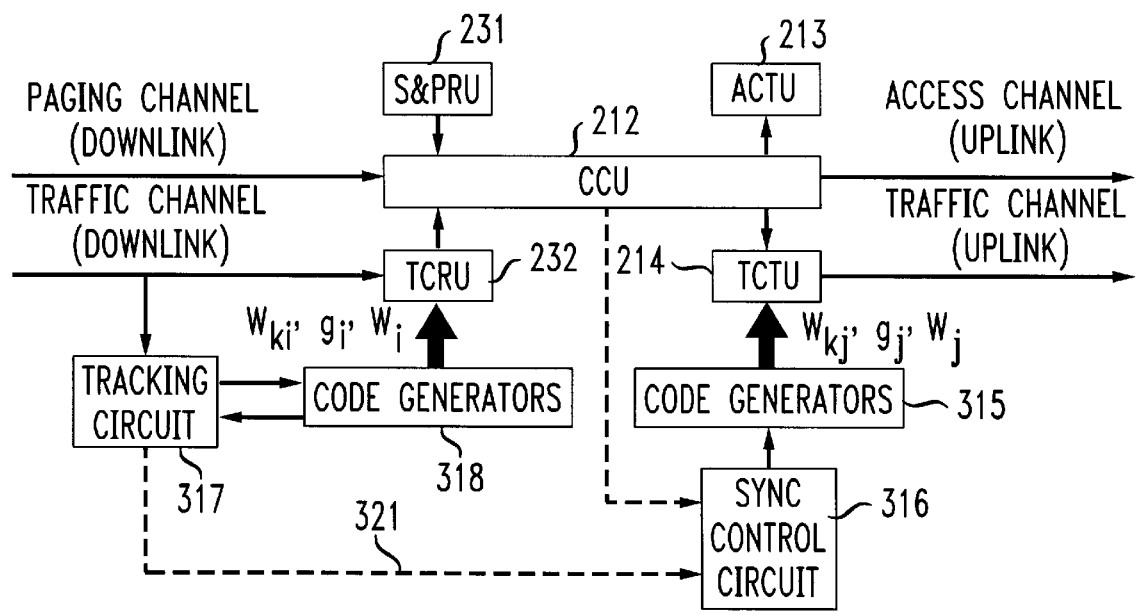
FIG. 3 is block diagram of a ground station used in the system of FIGS. 1 and 2.

The SU circuitry as shown in the FIG. 3 includes circuitry for functioning as a transmitter and as a receiver as well as including circuitry for tracking and synchronization. The identifying integers in FIG. 3 are the same as those for both partial units shown in the FIG. 2 disclosure. An ACTU 213 under the control of a Call Control Unit (CCU) 212 generates access channel requests which are transmitted to the satellite 203. This ACTU is disclosed and described in detail below when referring to FIG. 5. Uplink Traffic channels are transmitted under control of the CCU 212 by the TCTU 214. The individual CDMA encoded traffic channels are created by spreading codes supplied by the code generators 315.

Code generation is overall system synchronized by the SYNC control circuit 316 which responds to the CCU 212 and a tracking channel circuit 317 which synchronizes to received downlink signals transmitted by the satellite 202 to the TCRU 232. The tracking circuit 317 synchronizes the code generators 318 to generate the despreading codes and well as the code generators 315, via dotted lead 321, generating spreading codes. The despreading codes are applied to the TCRU 232 which applies the code to received signals in the CCU 212. The downlink paging channel signals received by S&PRU 231 are also applied to the CCU 212.

Figure 11:
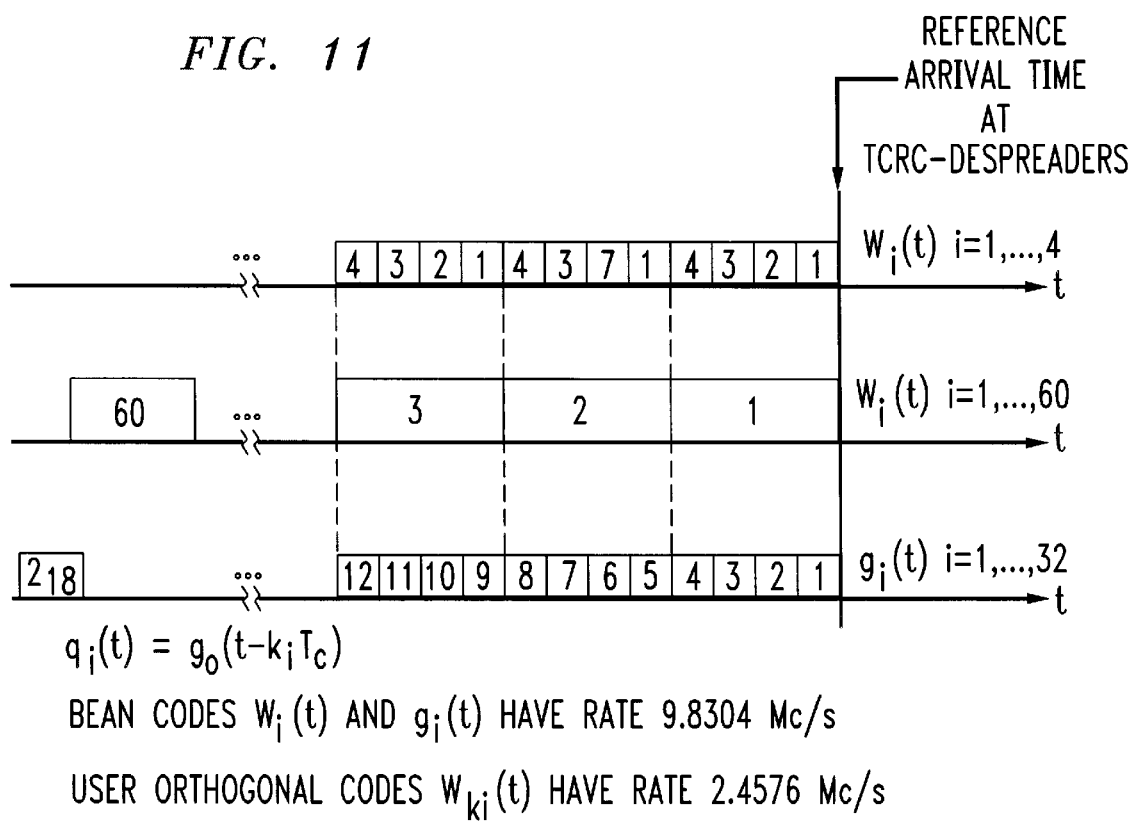
FIG. 11 is a graph of synchronized arrival times of CDMA codes.

As indicated synchronization is global or system wide and is defined in terms of the alignment of spreading chips of beam and user codes at satellite receivers. In the particular illustrative example (see FIG. 11), beam codes $W_i(t)$ and beam code $g_i(t)$ and user orthogonal $W_{ki}(t)$ have the same identical arrival time at the despreaders of the the satellite. Uplink access signals are acquired at a satellite ACRU and downlink paging and pilot and sync signals are acquired at a ground station SYNC & PRU. A reference propagation delay time is established in terms of quantified timing marks with intervals specified within a size range defined by chip intervals used in the CDMA spreading codes of the system. The propagation delay is defined in terms of one of the quantified timing marks defining when a first signal from a ground subscriber unit is received. This propagation delay is transmitted to a ground subscriber unit and utilized to adjust the timing of uplink CDMA code chips defining uplink traffic channel transmissions.

Figure 4:
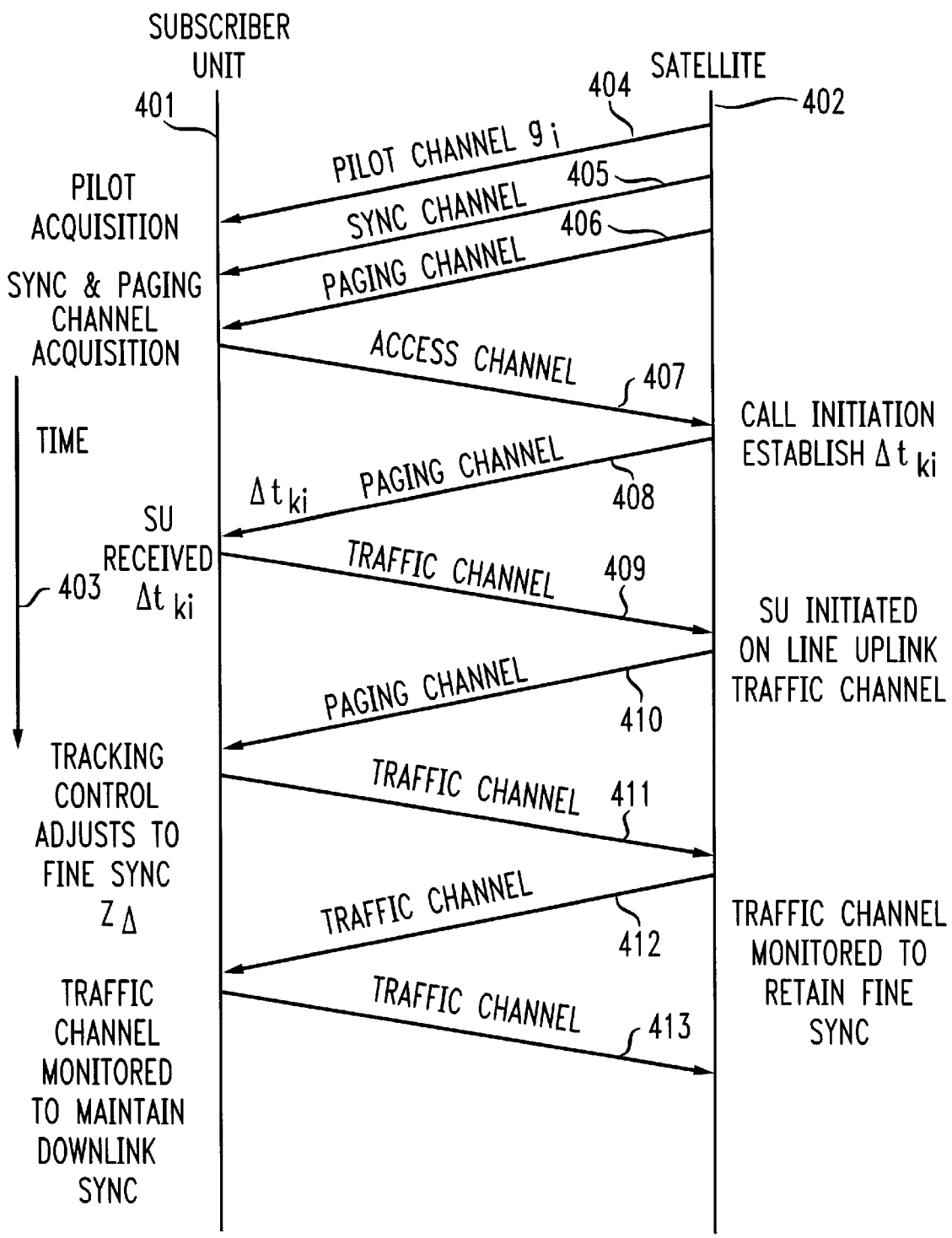
FIG. 4 is a chart of successive signaling conducted between a ground station and a satellite to establish global synchronization within the active communication system.

An intuitive understanding of the synchronization process may readily ascertained by reference to the signal process graph of FIG. 4. The two vertical lines 401 and 402 represent signal terminations at the subscriber ground station and the satellite, respectively. The time is proceeding forward in the downward vertical direction, as shown by time arrow 403. Each sloped and directed substantially horizontal line represents the transmission of a signal used in the synchronization process with its direction designated by an arrow on the line at the signal terminus.

Figure 12:
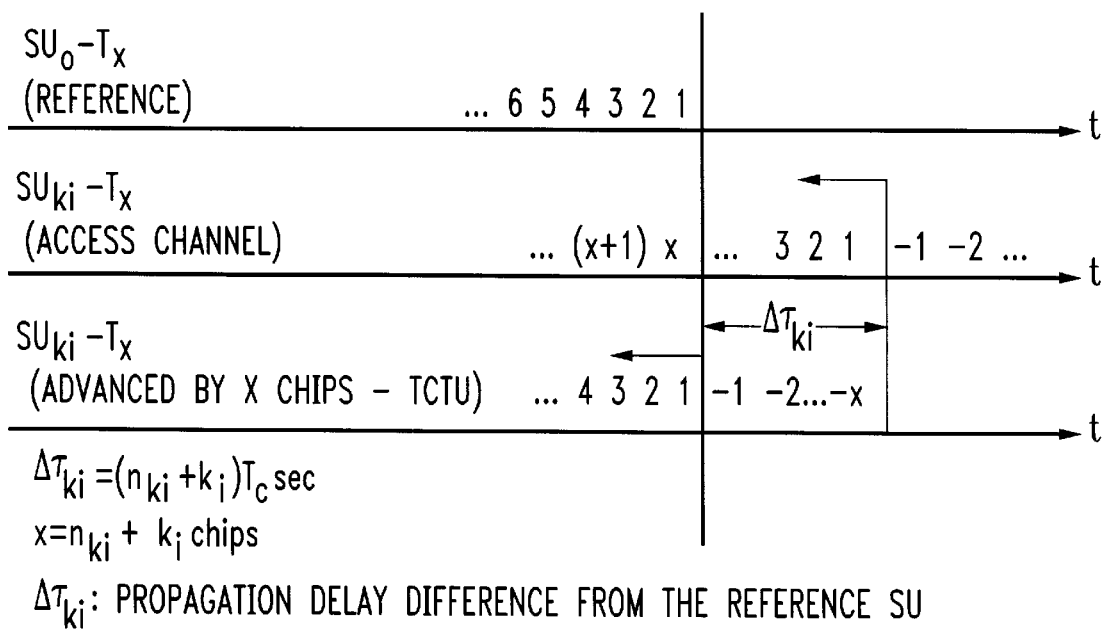
FIG. 12 is a graph of the propagation delay correction between ground and satellite.

The initial signal, represented by line 404, is an asynchronous pilot signals comprising a PN sequence of code chips ($g_i$)which is transmitted from the satellite (line 402) and received by the S&PRU of the ground station (line 401). This is followed by a SYNC channel signal and paging channel. The ground station acquires the SYNC channel, line 405, and the paging channel, line 406, which provides the pilot phase offset for the beam i($\Delta$i). Successful reception of a packet from the ground station over the access channel, line 407, by the ACRU of the satellite permits a determination of a propagation delay difference, $\Delta T_{ik}$, of the k ground station in beam i. This delay value $\Delta T_{ki}$, shown graphically in the FIG. 12 is transmitted by the paging channel, line 408, from the satellite to the ground station to achieve a coarse synchronization, between ground station and satellite. The code chips in the next uplink beam, line 409, from ground station to satellite are advanced or retarded by the TCTU, as shown in the FIG. 12 as needed to achieve this coarse synchronization, by adjustment of chip generator starting times. This change is returned to the ground station by paging channel 410.

A tracking procedure is engaged with the subsequent traffic channel transmission, line 411, 412 and 413, etc., of the ground station to fine tune the synchronization by means of a feedback control loop, by means of the system of FIG. 14, as discussed below. The ground station continues to transmit synchronized uplink signals to the satellite, line 401. Fine alignment is continuously updated by insertion of timing jitter for timing adjustment on the uplink timing channel by traffic channel transmissions.

Figure 19:
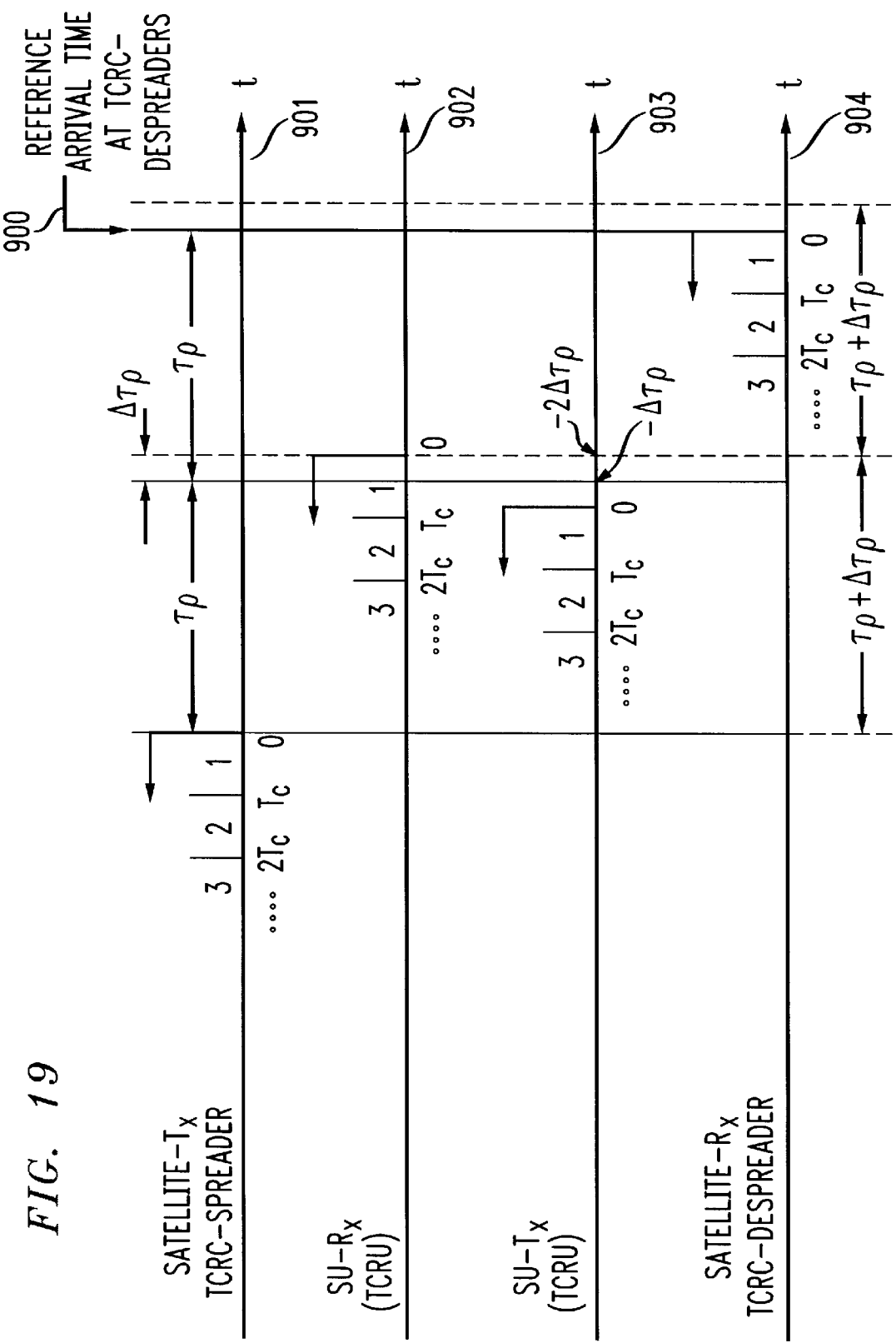
FIG. 19 is a timing diagram of the open loop tracking.

The timing of signals in the procedure, for maintaining synchronization is shown in the FIG. 19. The relation of various signals in transit to the arrival time at the TCRC despreaders is shown. The satellite transmission, of the top line 901 shows the code chips having a period of $\tau_p$ and in synchronization with the reference line 900. The signal in line 902 shows the delayed reception at the SU. Timing of the signal transmitted by the SU is shown in the line 903 and its arrival at the TCRC despreader is shown in the line 904. The line 904 indicates the offset of the time $\Delta\tau_p$ to the overall transmission time.

Figure 14:
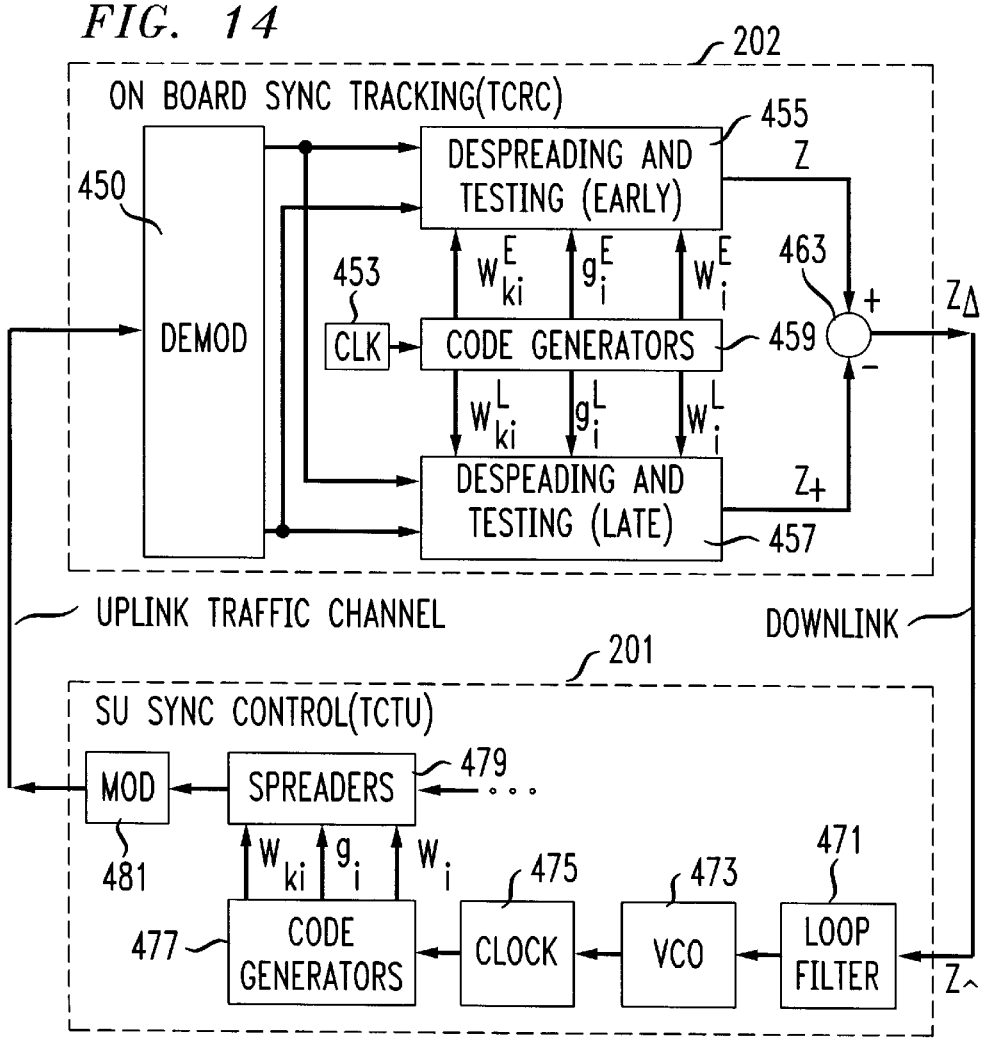
FIG. 14 is a schematic of a tracking feedback connection to enable synchronization between satellite and ground stations.
Figure 15:
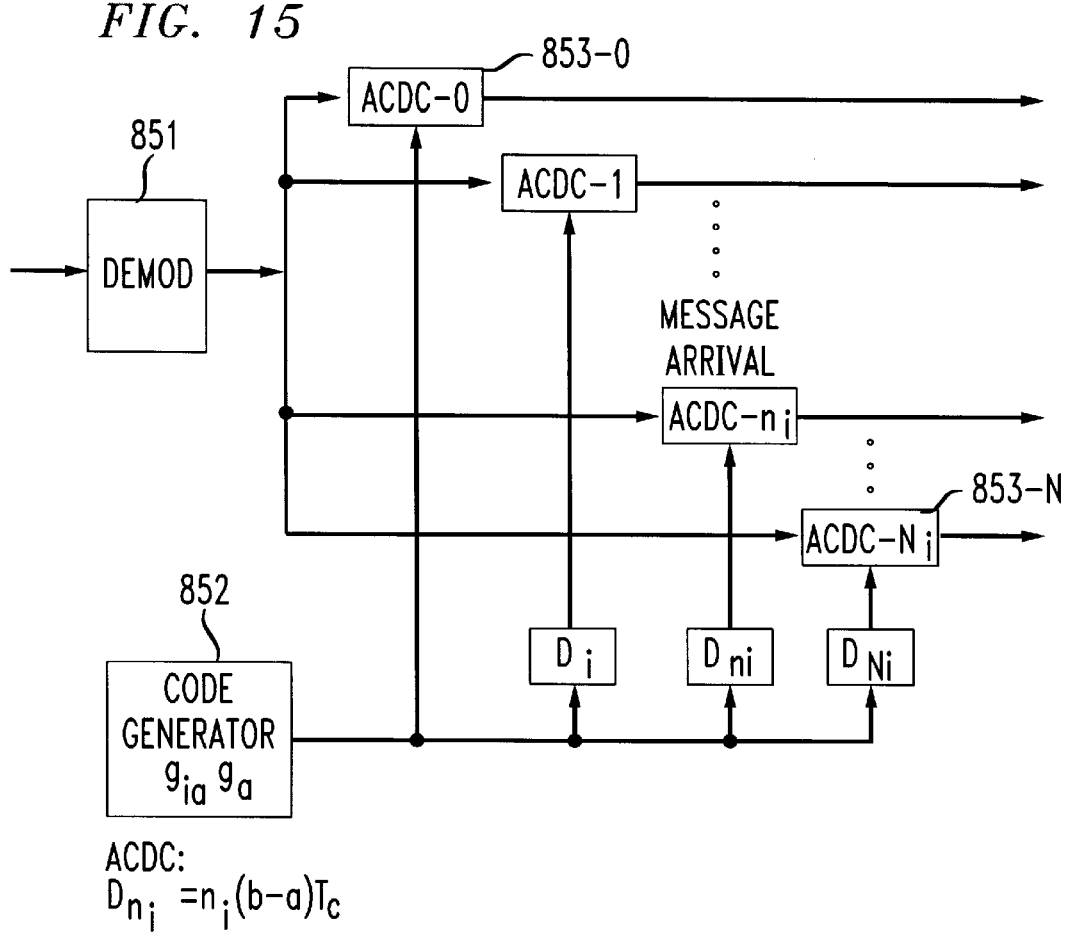
FIG. 15 is a block schematic of a parallel access channel detection array for the access channel receiver of FIG. 8.

A general schematic of the tracking control for tracking and controlling synchronization of traffic channels, to achieve global synchronization of traffic channels, is shown in the FIG. 14. Synchronization is achieved by an interactive feedback loop between the SU 201 and the satellite 202. Signals received at the satellite 202 are demodulated in demodulator 451. The demodulated signals are connected to the despreading and testing circuits 455 and 457 which are the recipients of the code generated by the code generators in an assemblage of code generators in block 459 all under control of clock 453. The code generators of assemblage 459 apply early timed codes $W_{ki}^E$ $g_i^E$ and $W_i^E$ to the despreading circuitry (early) 455. Late timed codes $W_{ki}^L$ $g_i^L$ and $W_i^L$ are applied to despreading circuitry (late) 457.

Figure 18:
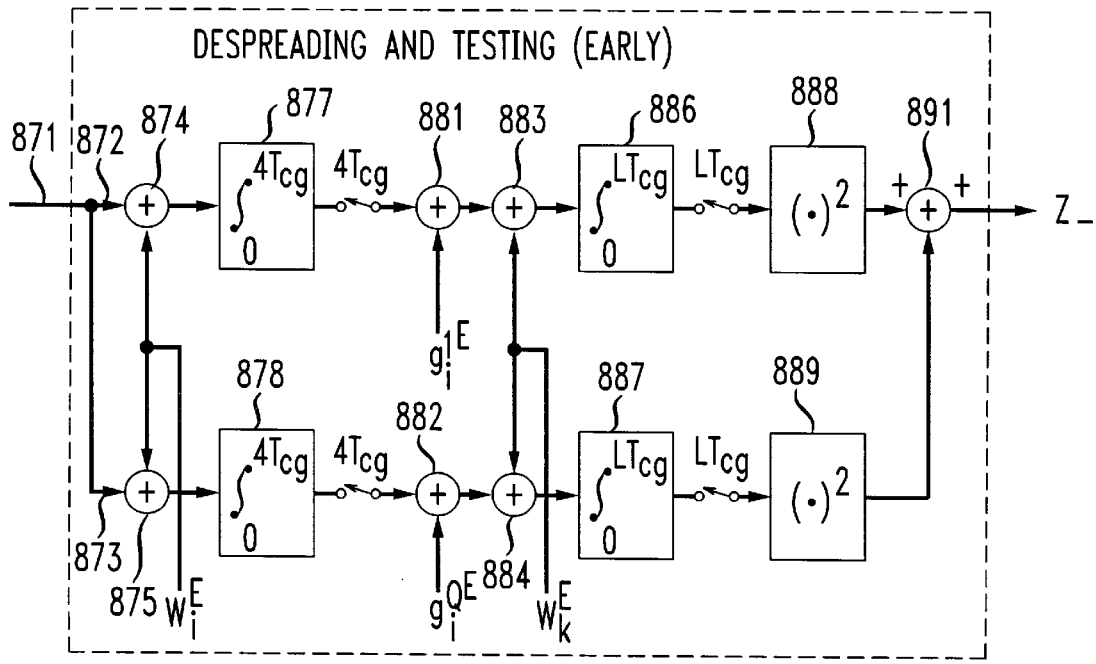
FIG. 18 is a schematic of a despreader circuit used in the open loop sync tracking of FIG. 14.

The despreaders 455 and 457 each comprise circuitry to determine an offset of chip transitions from the reference transitions. Circuitry for this function (early) is shown in FIG. 18. Incoming traffic channels, on lead 871, are divided into two paths 872 and 873, respectively. The parallel signals, of paths 872 and 873 are exclusive ORed in gates 874 and 875, respectively by the spreading code $W_i^E$ and integrated in integrators 877 and 878. Further exclusive ORing is achieved in gates 881 and 882 and 883 and 884 with respect to the spreading codes $g^E$ (in-phase and quadrature) and $W_k^E$. The two signals are again integrated (886, 887) and squared (888, 889) and summed in summer 891.

The early and late despread signals are differentially summed, as shown in FIG. 14, in summer 463 and the signal $Z_\Delta$ generated for downlink transmission.

This signal $Z_\Delta$ is transmitted to the SU 201 to its loop filter 471 which filters $Z_{66}$ to generate a representative voltage for controlling the VCO 473 which in turn controls the rate of clock 475. Clock 475 drives the code generators 477 which in turn excite the signal spreaders 479. The excited signal of the spreaders is modulated in modulator 481 and transmitted uplink to the satellite 202.

Figure 5:
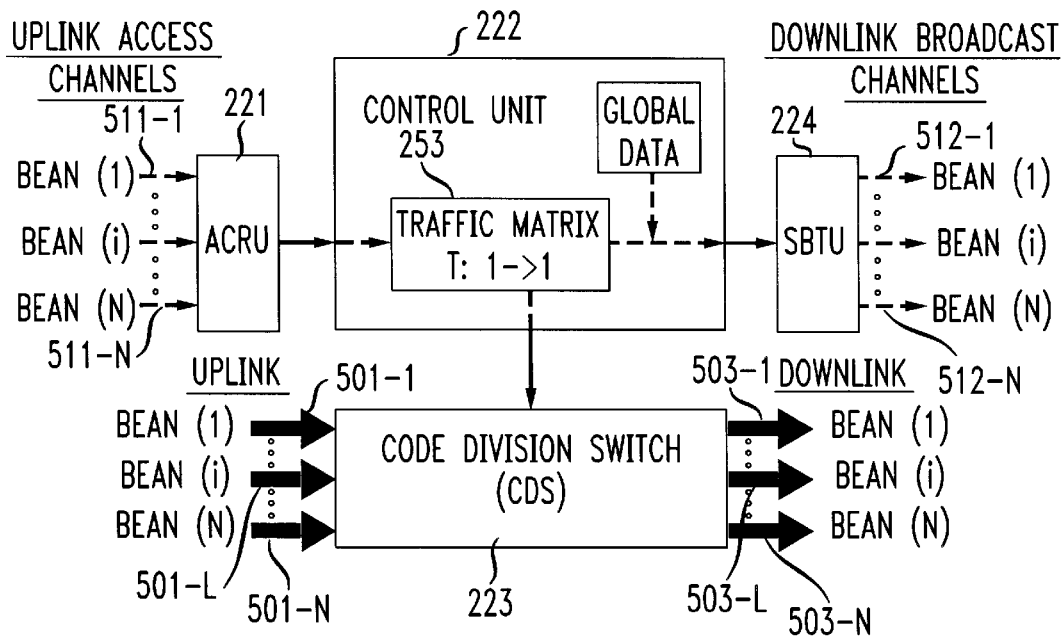
FIG. 5 is a block diagram of the satellite circuitry.

Block diagrams of the satellite switching circuitry, as shown in the FIG. 5, include some of the blocks shown in the FIG. 2. Block inputs and outputs are additionally shown to indicate the signal flow more clearly. CDS 223 receives the uplink beams 501-1 through 501-N and distributes the traffic channels contained therein among the downlink beams 503-1 through 503-N. The switched transfer of traffic channels from uplink to downlink beams is under control of a stored program uplink-downlink traffic matrix 253 included in the CU 222. Entries of the traffic matrix are derived from uplink access signals 511-1 through 511-N related to uplink beams applied to the ACRU 221. Beams 512-1 through 512-N including the SYNC and paging signals are transmitted, via the SBTU 224, to the receiving SU. Switching in the CDS is by means of traffic channel recovery circuits (TCRC) (not shown) which despread the CDMA beam to recover individual traffic channels. The individual traffic channels are respread and combined into beams for downlink transmission to a SU. TCRCs are discussed in the filed application Ser. No. 08/635,162 filed Apr. 23, 1996.

Figure 6:
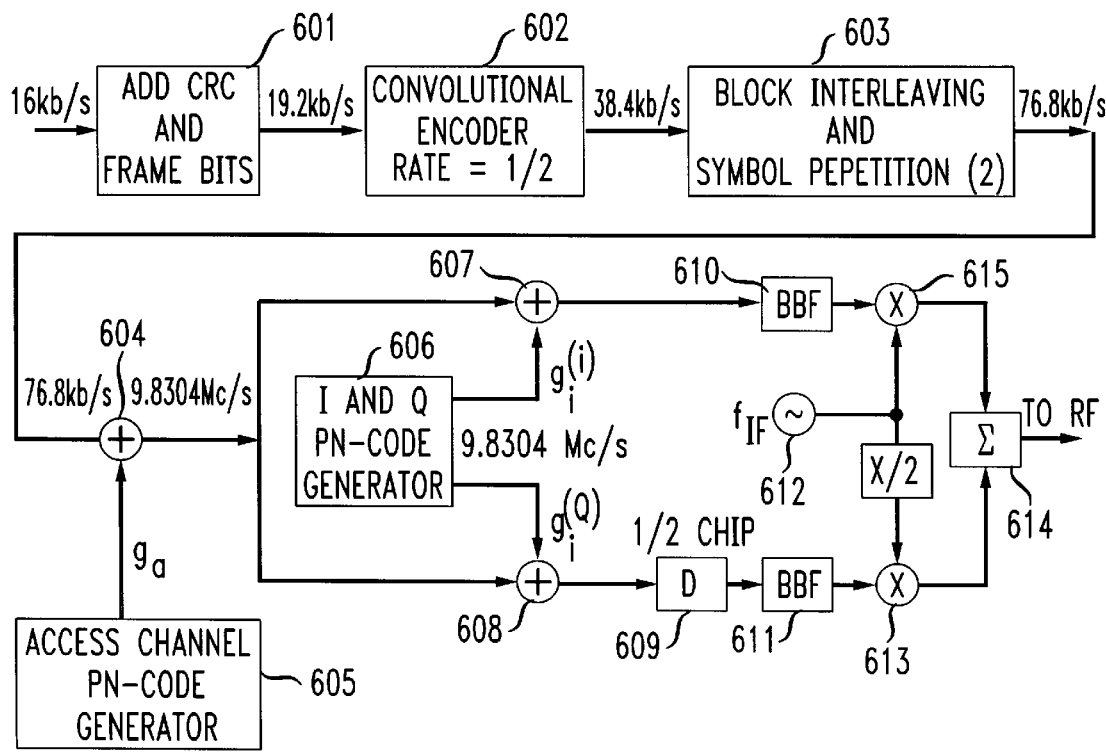
FIG. 6 is a block diagram of an access channel transmitter unit included in the subscriber unit/station of FIG. 3.

Structure of an illustrative Access Channel Transmitter Unit (ACTU), as shown in the FIG. 6 receives an access signal at 16 kb/s and adds cyclic redundancy encoding and frames the bits in the CRC and Frame circuitry in block 601. The framed signal is connected to a ½ convolutional encoder 602 with the encoded sequence output of the CRC and Frame circuitry transmitted through the memoryless channel with a shift register to process the signal. The convolutional encoded symbol signal (38.4 ks/s), essentially the output of a finite state machine in which bits are converted into blocks, is block interleaved with symbol repetition (2) in the interleaving unit 603. Interleaved symbols and an Access channel PN code $g_a$ of generator 605 are both applied to exclusive or gate 604 resulting in a symbol rate of 9.804 Mc/s which signal is applied in parallel to the exclusive or gates 602 and 608. In phase and quadrature phase PN codes $g_i(I)$ and $g_i(Q)$ are applied by generator 606 to gates 602 and 608 respectively. Outputs of the gates 602 and 608 are applied to the baseband filter circuits 610 and 611. The output of gate 609 is transmitted via a ½ chip delay circuit 609. Outputs of both the filters are applied to the mixers 615 and 613 to be mixed with the direct and phase shifted output of sinusoidal generator 612 respectively. Both mixed signals are summed in summing circuit 614 prior to radio transmission to the satellite.

The processing by the ACTU of FIG. 6 generates an access channel associated with a paging channel (there may be more than one access channel associated with a particular paging channel). Access messages are time slotted and have a length of one time slot. Transmissions obey a random access protocol which employs a delay capture mechanism in which message transmissions are randomly delayed to allow individual messages a chip or more apart to be distinguished. By further randomization of the time slots the probability of message collisions is reduced.

Figure 7:
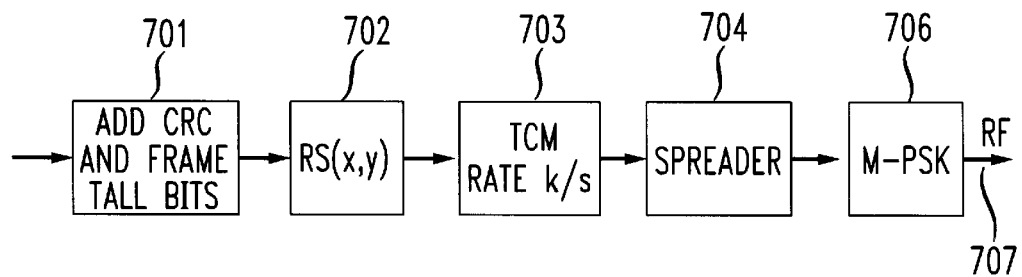
FIG. 7 is a block diagram of an uplink traffic channel transmitter unit included in the subscriber unit/station of FIG. 3.

The uplink traffic channel transmitter unit included in the subscriber unit/station of FIG. 3 is shown in the FIG. 7. It combines trellis code modulation with CDMA spreading to achieve a spectrally efficient signal. Details of this circuitry is disclosed in my co-pending application Ser. No. 08/644346 filed May 10, 1996 which is incorporated herein by reference. Unit 701 adds CRC to the signal and frames the bits. Coder 702 applies reed-Solomon coding and modulator 703 trellis code modulates the Reed Solomon encoded signal. Spreading circuitry 704 converts the signal to CDMA format and the CDMA signal is phase shift keyed in the keying circuitry 706 to produce the RF signal on output lead 707. While trellis code modulation is shown, turbo code modulation is equally suitable for this application.

Figure 8:
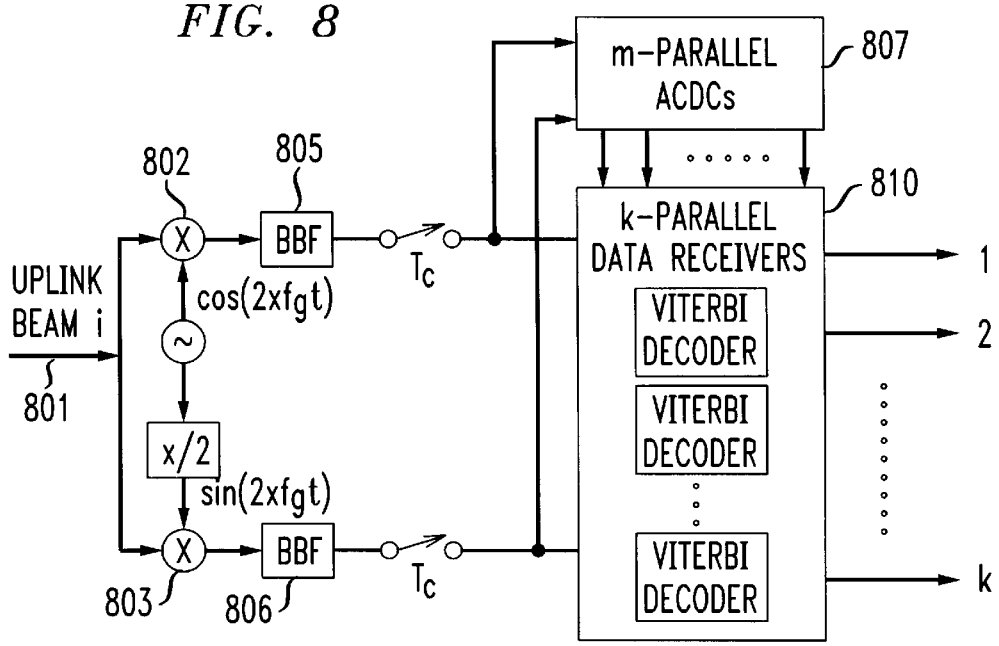
FIG. 8 is a block diagram of an access channel receiver unit included in the satellite of FIG. 5.

Transmissions over the access channel are received at the Access Channel Receiver Unit (ACRU) (see FIG. 8) on board the satellite. The uplink access signal is received and applied in parallel to the mixers 802 and 803, via lead 801. These mixers 802 and 803 are excited by a cos. and sin. signal respectively and each is baseband filtered in filters 805 and 806 respectively, and forwarded to an array of Viterbi decoders 808 to recover the bit stream. These filtered signals are also applied to the Access Channel Detection Circuit 807 which applies signals to assign data receivers in the Viterbi decoders.

Figure 16:
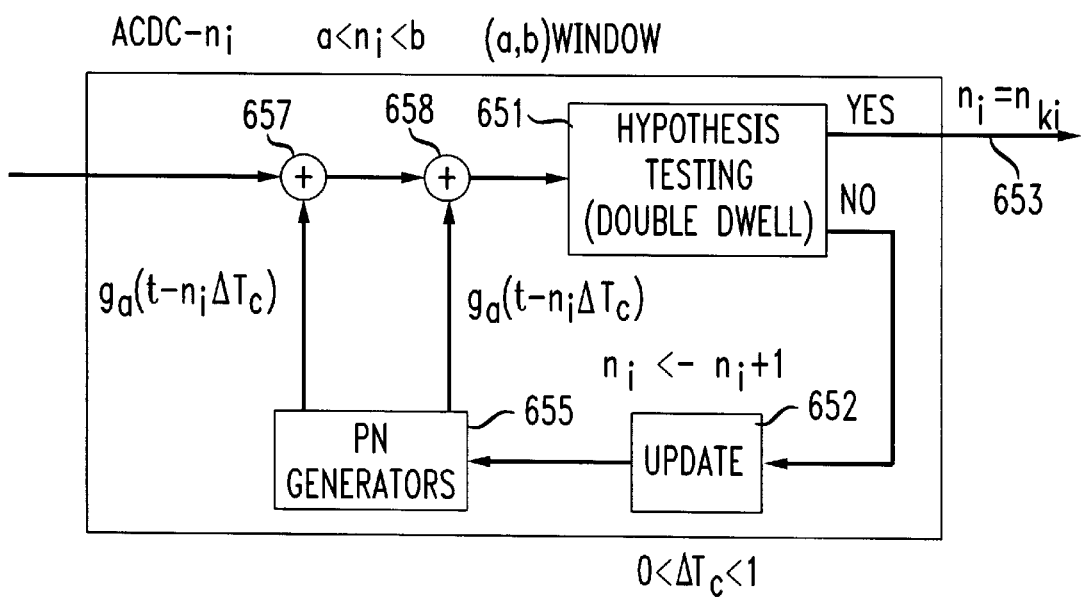
FIG. 16 is an implementation of a channel detector in the circuit of FIG. 15.

A plurality of Access Code Detection Circuits (ACDC) are connected in parallel as shown in the FIG. 16 for one input channel. The output of demodulator 851 is applied to the ACDCs 0 through N in parallel, 853-0 to 853-n. ACDC 0 is excited by a code provided by generator 852. ACDC 1 is excited by the same code delayed by delay circuit D1 and ACDC 2 is excited by this code delayed by D1 and D2. The actual message is excited when the message arrival time coincides with the correct number of delays as in Dn. Hence the message arrival time is quantized in terms of the delays encountered.

The ACDC circuitry as shown in the FIG. 16 includes a double dwell tester 651 connected to a feedback loop including an update block 652 to advance the count of rejected tests and an output 653 for successful dwell tests. The input to the PN generators 655 from the update is advanced by $\Delta T_c$ by the output of the Update block and plus and minus codes are exclusively ORed in gates 657 and 658 with the input to the double dwell tester. If the output of demodulator 851 is within the dwell the yes output 653 identifies the quantum location of the code.

Figure 13:
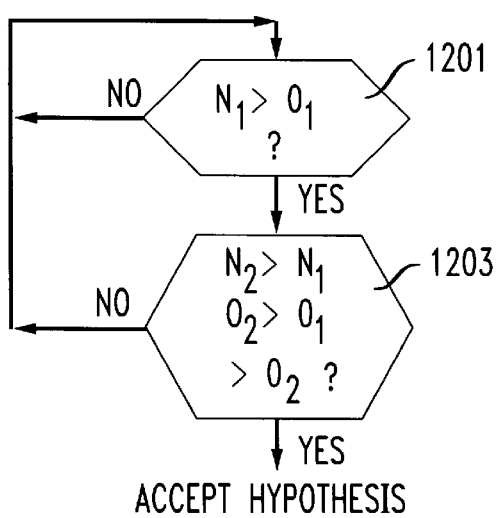
FIG. 13 is a flow chart of a double dwell flow process.

Double dwell testing procedure is shown in the FIG. 13. The algorithm of FIG. 13 depicts a double dwell serial search algorithm in pilot acquisition. In the double dwell process the process is endlessly recirculating. In decision block 1201 a small number of chips N1 (e.g., 500 out of $2^{18}$) are tested to see if the chip energy exceeds a threshold 1. If the threshold is exceeded a larger number of chips are tested, in decision block 1203, to see if a second threshold 2 is exceeded. If both tests are passed the signal is accepted. The object of the process is to determine the number of chips counted in the window of the ACDC circuitry wherein the chips of fully exercised circuits and the partial incomplete count of the unfilled ACDC circuit determines the propagation time delay in terms of chip counts. These tests and the pilot acquisition circuitry is known in theory and presentation of details of the circuitry are believed unnecessary.

Figure 9:
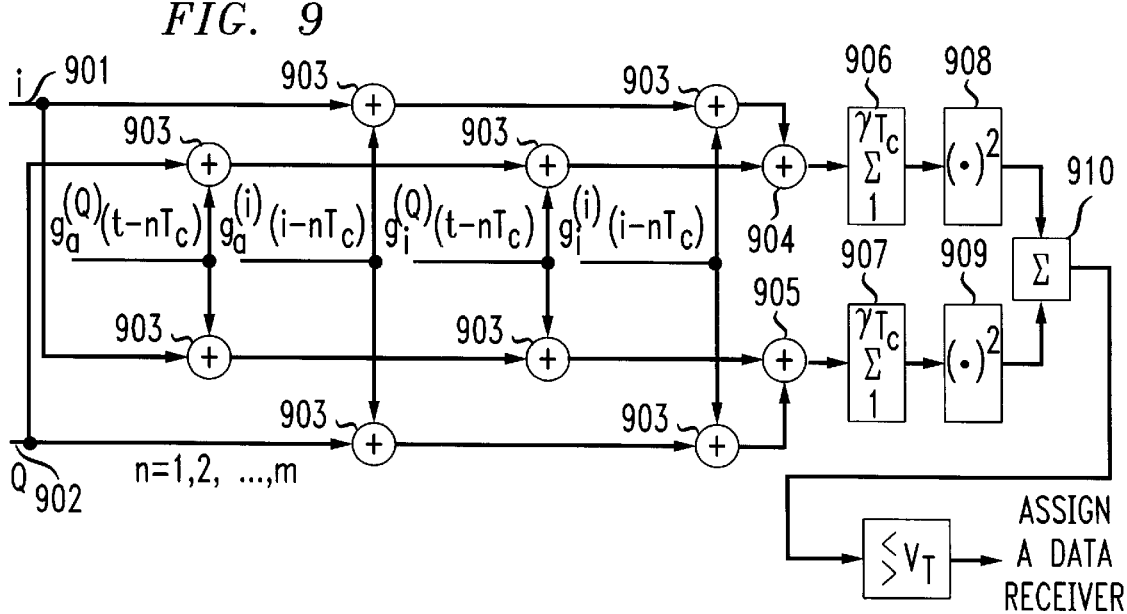
FIG. 9 is a block diagram of an access channel detection circuit included in the access channel receiver unit of FIG. 8.

The individual Access Channel Detection Circuit (ACDC) (see FIG. 9) located on board the satellite is shown in the FIG. 9. It receives the in phase and quadrature phase signal generated in the ACRU at input leads 901 and 902, respectively. The signals on leads 901 and 902 are split into parallel paths each parallel path having exclusive OR gates 903 with which the parallel signals are excited by quadrature and in phase despreading codes. (e.g.,$g_a$ (q) (t-$n_{tc}$); $g_a$ (I) (t-$n_{tc}$); $g_i$ (q) (t-$n_{tc}$); $g_i$ (I) (t-$n_{tc}$) to recover arriving messages that have been delayed by n chips. The excited in phase and quadrature phase signals are applied, via exclusive OR gates 904 and 905, to the summers 906 and 907. Outputs from each summer 906 and 897 represent detected messages, which are applied to squaring circuits 908 and 909 and further applied to the summer 910. The resulting signals are applied to the Viterbi decoders as indicated in the ACRU shown in the FIG. 8.

Figure 10:
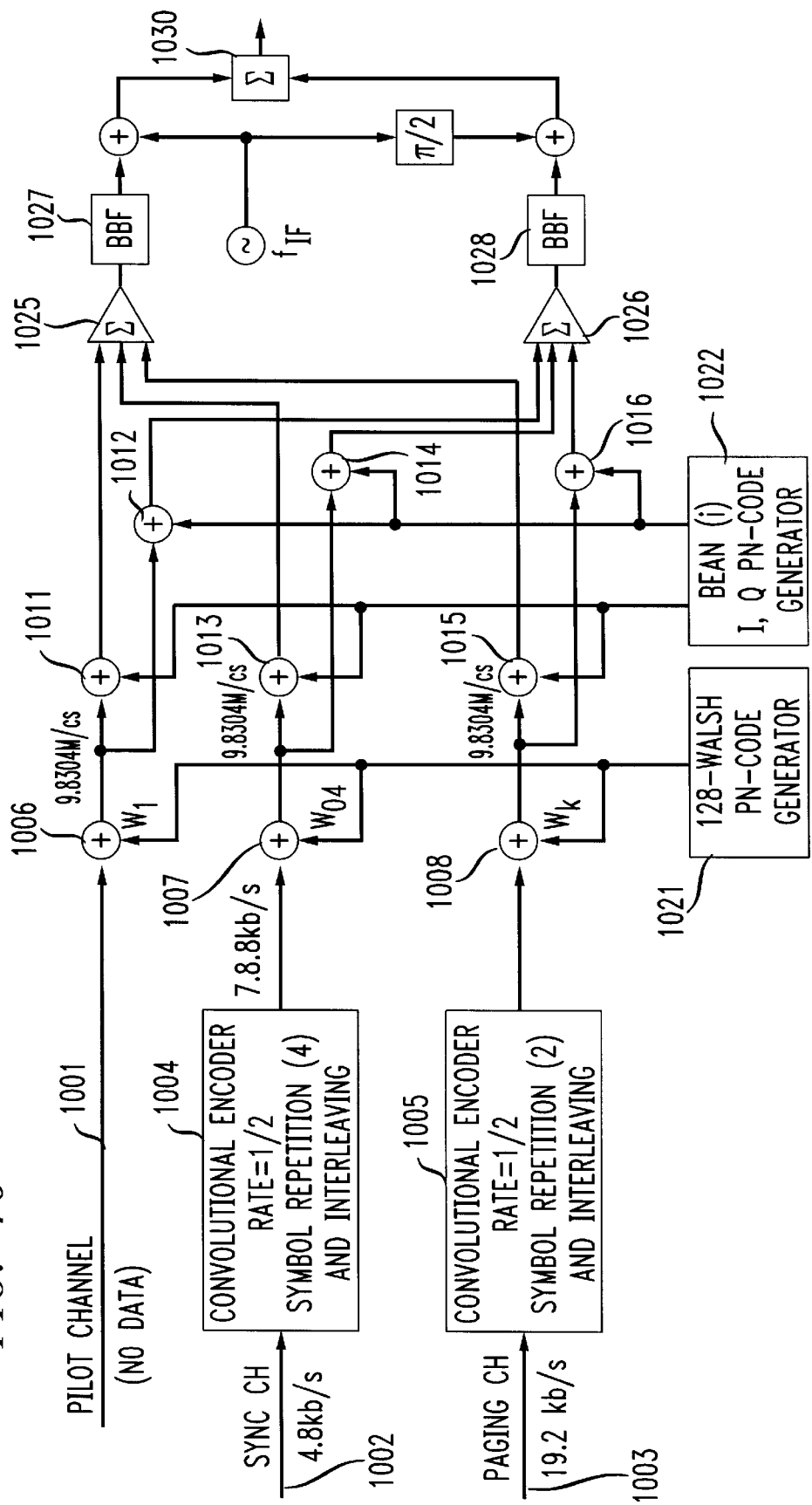
FIG. 10 is a block diagram of a satellite broadcast transmitter unit included in the satellite of FIG. 5.

Downlink control signals from the satellite are broadcast from the Satellite Broadcast Transmitter Unit (SBTU) 224 which is shown in block format in FIG. 10. Pilot, Sync and Paging signals are applied to input leads 1001, 1002 and 1003, respectively. The pilot channel is transmitted at all times and the offset of its code sequence is used as a time reference. The Sync channel transmits beam synchronization information to the subscriber unit for receiving paging channels and transmitting access channels. The paging channel sends paging information that enables the subscriber unit to respond to access channel requests.

Sync channel signals and Paging channel signals, on leads 1002 and 1003, are applied to a signal processor 1004 and 1005, respectively, to perform the functions of convolutional encoding bits into blocks and interleaving of the blocks. The pilot signal and the processed Sync and Paging signals are excited by a Walsh PN code at exclusive OR gates 1006, 1007 and 1008, to achieve orthogonality. The spreading code is provided by the code generator 1021. The spread signals are subject to a beam spreading code in the exclusive OR gates 1011, 1013 and 1015, and in gates 1012, 1014 and 1016, which are excited by in phase and quadrature phase PN spreading codes provided by generator 1022. All the in phase and quadrature channels are combined in the summing circuits 1025 and 1026 and transmitted to the baseband filters 1027 and 1028, respectively. These in phase and quadrature filter outputs are mixed to produce an IF signal which is applied to the summer 1030 for output to be transmitted to the receiving subscriber unit.

Figure 17:
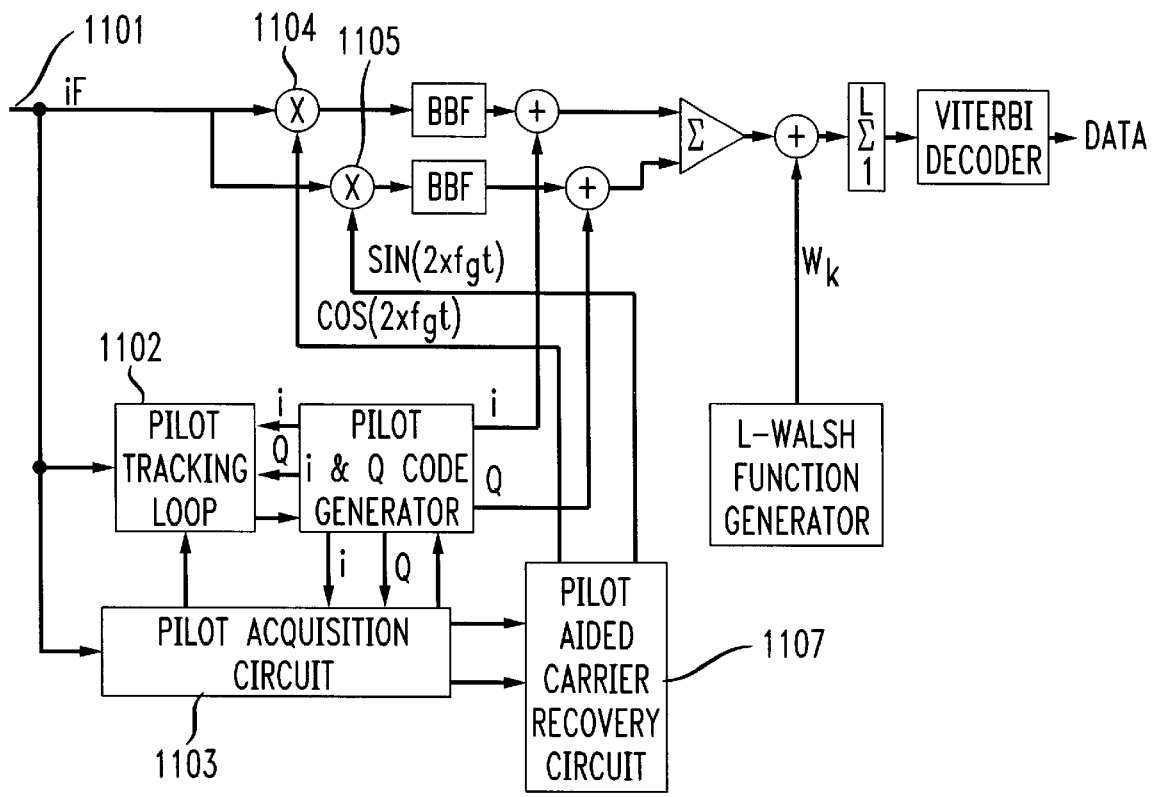
FIG. 17 is a schematic of the SYNC and pilot receiver unit of FIG. 2.

Sync channel signals and Paging channel signals are received by a Sync and Paging Receiver unit (S&PRU) 231 (FIG. 17) at the receiving subscriber unit. If input is received at the input terminal 1101 and is conveyed to a pilot tracking loop 1102 and a pilot acquisition circuit 1103. This IF signal is also applied to two mixers 1104 and 1105 activated by a pilot aided carrier recovery circuit 1107.

A pilot tracking loop 1102 maintains phase integrity with the input IF signal by responding to the IF signal and input from the pilot acquisition circuit 1103.

The pilot tracking loop 1102 provides fine synchronization supplementary to the the coarse acquisition achieved by the pilot acquisition circuit. The pilot tracking circuit determines the clock delays and advances of the pilot signal.

LIST OF ACRONYMS

ACDC: Access Channel Detection Circuit
ACRU: Access Channel Receiver Unit
ACTU: Access Channel Transmitter Unit
CCU: Call Control Unit
CDS: Code Division Switch
CU: Control Unit
SBTU: Satellite Broadcast Transmitter Unit
S&PRU: SYNC & Paging Receiver Unit
SU: Subscriber Unit
TCRC: Traffic Channel Recovery Circuit
TCRU: Traffic Channel Receiver Unit
TCTU: Traffic Channel Transmitter Unit
TE: Terminal Equipment
TU: Transceiver Unit

The invention claimed is:

1. A method of synchronizing CDMA processing in a satellite communication system connecting multi-point ground stations, comprising the steps of:

acquiring access and Synchronization signals transmitted by a satellite at a terrestrial subscriber unit;

setting a reference propagation delay time;

establishing a propagation delay in terms of arrival of a message in relation to one of a plurality of quantified timing marks subsequent to the reference propagation delay time, when the satellite receives a first signal from the terrestrial subscriber unit on an access channel;

conveying the established quantified propagation delay to the terrestrial subscriber unit;

adjusting timing of uplink CDMA code chips at the terrestrial subscriber unit from the original reference propagation delay derived from the access channel;

tracking synchronizing by adjusting code delay of the uplink arrival time of a reference code; and retaining synchronization by downlink code delay transmission.

2. A method of synchronizing CDMA processing in a satellite communication system connecting multi-point ground stations, as claimed in claim 1, wherein:

the step of: establishing a propagation delay includes the steps of:
   generating a sequence of quantified delays; and
   locating in time an arrival of an access message between a pair of adjacent ones of the sequence of quantified delays.

3. A method of synchronizing CDMA processing in a satellite communication system connecting multi-point ground stations, as claimed in claim 1, wherein:

the step of adjusting timing includes the steps of:
   determining the propagation delay difference; and
   advancing the code chips by the number of chip intervals in the propagation delay difference.

4. A method of synchronizing CDMA processing in a satellite communication system connecting multi-point ground stations, as claimed in claim 1, wherein:

the step of tracking synchronization includes the steps of:
   premature despreading of the uplink signal;
   delayed spreading of the uplink signal; and
   combining the premature and delayed spreading results.

5. A method of synchronizing CDMA processing in a satellite communication system connecting multi-point ground stations, as claimed in claim 4, wherein:

the step of tracking synchronization includes the step of:
   clocking the spreading of downlink signals in response to the combined premature and delayed spreading results.

6. A method of providing synchronization of code sequences between a satellite and a ground station, comprising the steps of:

acquiring at the ground station synchronization with a pilot PN code sequence transmitted by the satellite;

acquiring at the ground station a synchronization channel providing a pilot phase offset for a specified beam, for orthogonal codes of a paging channel and for PN code sequences of a related access channel;

responding to a message arrival at the satellite to establish a propagation delay difference from a reference arrival time and sending the delay difference to the ground station;

using the delay difference at the ground station to establish a first coarse synchronization with the reference arrival time; and inaugurating a tracking procedure at the satellite in response to a signal from the ground station to provide fine alignment of code with the reference arrival time at the despreaders within the satellite.

7. In a communication system in which a ground station transmits a CDMA beam to a satellite receiver which code switches the beam for re-transmission to a receiving ground station, a method of synchronizing the system by controlling timing of all beam PN spreading codes to have a common starting time, including the steps of:

synchronizing a ground station to a pilot PN sequence transmitted by the satellite upon a turn-on of the ground station;

acquiring at the ground station a sync channel from the satellite which provides a pilots phase offset;

transmitting an uplink signal from the ground station to the satellite to acquire a propagation delay difference derived from a satellite reference arrival time and transmitting the propagation delay difference from the satellite to the ground station;

establishing a coarse synchronization at the ground station to the satellite reference arrival time by using the propagation delay difference to advance or delay by a number of chips the starting point of an uplink beam code transmitted from the ground station to the satellite;

adding timing jitter to downlink signals from the satellite to the ground station;

tracking downlink signal transmissions which include the controlled timing jitter to make a timing adjustment to uplink transmissions from the ground station to the satellite.

8. A method of globally synchronizing CDMA signaling between at least one of a plurality of fixed location ground radio stations and a geostationary satellite radio station, comprising the steps of:

transmitting from the satellite station to the ground radio station acquisition signals to establish radio contact;

initiating a call from the ground radio station to the satellite radio station with an access channel signal to establish a propagation delay time;

transmitting the propagation delay time to the ground radio station; over a paging channel initiating a traffic channel connection between the ground radio station and the satellite radio station; and transmitting propagation delay variations exhibited on a downlink traffic channel and adjusting uplink traffic channel transmissions to compensate for the variations;

whereby all of the plurality of ground stations actively transmitting, transmit substantially in synchronization with one another.

9. A method of globally synchronizing CDMA signaling between at least one of a plurality of fixed location ground radio stations and a geostationary satellite radio station, as claimed in claim 8; where in the step of transmitting the propagation delay time include a step of determining a delay in terms of chips of a spreading code used for CDMA encoding.

10. A method of globally synchronizing CDMA signaling between at least one of a plurality of fixed location ground radio stations and a geostationary satellite radio station, as claimed in claim 8; where in the step of transmitting acquisition signals includes a step of transmitting a continuous asynchronous pilot channel and a continuous asynchronous paging channel.

11. A method of globally synchronizing CDMA signaling between at least one of a plurality of fixed location ground radio stations and a geostationary satellite radio station, as claimed in claim 8; where in the step of adjusting uplink traffic channel transmissions includes a step of adjusting a time alignment of CDMA spreading codes.

12. A method of globally synchronizing CDMA signaling between at least one of a plurality of fixed location ground radio stations and a geostationary satellite radio station, comprising the steps of:

firstly determining and utilizing a reference propagation delay time between a ground radio station and the satellite for achieving a coarse synchronization;

secondly aligning code chips of the CDMA signaling to achieve a fine synchronization of arrival times including the reference propagation delay time of uplink signals to the satellite.

13. The method of claim 12, comprising the further steps of:

transmitting propagation delay variations exhibited on a downlink traffic channel and adjusting uplink traffic channel transmissions to compensate for the variations.

14. The method of claim 12, comprising the further steps of:

initiating a call from the ground radio station to the satellite radio station with an access channel signal to establish a propagation delay time.

15. The method of claim 12, comprising the further steps of:

maintaining a tracking procedure between satellite and ground station to maintain synchronization.

16. A method of globally synchronizing CDMA signaling between at least one of a plurality of fixed location ground radio stations and a geostationary satellite radio sation, comprising the steps of:

determining a propagation delay between a ground radio station and the satellite for achieving a coarse synchronization using access channel signals;

transmitting propagation delay variations exhibited on a downlink traffic channel and adjusting uplink traffic channel transmission using voice and data transmission to compensate for the variations; and adjusting the timing of code chips of the CDMA signal to adjust and compensate for the variations, and achieve a fine synchronization of arrival times of uplink signals to the satellite.

* * * * *